(12) United States Patent
Veitsel et al.

(10) Patent No.: US 9,391,655 B2
(45) Date of Patent: *Jul. 12, 2016

(54) DIGITAL FILTER FOR NARROWBAND INTERFERENCE REJECTION

(71) Applicant: Topcon Positioning Systems, Inc., Livermore, CA (US)

(72) Inventors: Andrey V. Veitsel, Moscow (RU); Victor A. Prasolov, Moscow (RU); Dmitry D. Murzinov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,130

(22) Filed: Jan. 12, 2016

(65) Prior Publication Data

US 2016/0126991 A1  May 5, 2016

Related U.S. Application Data

(63) Continuation of application No. 14/370,947, filed as application No. PCT/RU2013/000961 on Oct. 13, 2013.

(51) Int. Cl.
*H04B 1/00* (2006.01)
*H04B 1/10* (2006.01)

(52) U.S. Cl.
CPC ...... *H04B 1/1036* (2013.01); *H04B 2001/1063* (2013.01)

(58) Field of Classification Search
CPC .................. H04B 1/7101; H04B 2201/709709
USPC ......................................................... 375/148
See application file for complete search history.

(56) References Cited

U.S. PATENT DOCUMENTS

| | | | | |
|---|---|---|---|---|
| 7,190,710 B2* | 3/2007 | Yousef | ...................... | H04B 1/71 375/144 |
| 7,277,475 B1* | 10/2007 | Nguyen | ............... | H04B 1/1036 375/144 |
| 7,660,374 B2* | 2/2010 | Casabona | ............... | G01S 19/21 375/144 |

* cited by examiner

*Primary Examiner* — David S Huang
(74) *Attorney, Agent, or Firm* — Bardmesser Law Group

(57) ABSTRACT

A digital filter for narrowband interference rejection, including modules of narrowband interference rejection connected in series, each of which includes the following elements connected in series: a block of successive vector rotation based on the CORDIC vector rotation algorithm for integers, a block of reduction of the length of the rotated vector to maintain the same number of bits for digital signal representation, a block of high-pass filters for orthogonal components of the reduced vector in order to remove the interference from zero frequency region. The filter can be implemented without multiplication.

7 Claims, 5 Drawing Sheets

DIGITAL FILTER FOR NARROWBAND INTERFERENCE REJECTION

CROSS REFERENCE TO RELATED APPLICATIONS

This application is a continuation of U.S. patent application Ser. No. 14/370,947, filed on Jul. 7, 2014, which is a US National Phase of PCT/RU2013/000961, filed on Oct. 28, 2013.

BACKGROUND OF THE INVENTION

High-power narrow-band interferences can disrupt broadband data transmission systems, navigation systems, high definition television and so on. Various conventional methods are available to reject interferences, such as:

U.S. Pat. No. 6,219,088, entitled "NTSC interference rejection filter", describes an electronic, programmable filter that selectively removes interference, noise or distortion components from a baseband spectrum which is combined in a complex mixer with a synthesized frequency signal that shifts the spectrum of characteristic amount into the frequency domain such that the position of the interference component will be in the region about DC. Once shifted, the frequency components about DC are removed by a DC canceler circuit and the resulting spectrum is mixed with a subsequent synthesized frequency signal which shifts the spectrum back to its original representation and baseband. The frequency signals are developed by a programmable frequency synthesizer which may be programmed by a user together with an intelligence signal that defines the frequency location of an interference signal within the spectrum.

U.S. Pat. No. 5,263,048, entitled "Narrow band interference frequency excision method and means," discloses a method for excising narrow band interferers in a spread spectrum signal communication, which includes the steps of: receiving the spread spectrum signal; digitizing the spread spectrum signal; transforming the digitized signal from the time domain to the frequency domain; discarding the magnitude of the digitized signal and replacing it with a normalized value; and transforming the digitized signal back to the time domain.

EP 1578022, entitled "Narrow band interference suppressor" discloses a plurality of interference signal elimination (ISE) circuits that are connected in series. Each ISE circuit includes a mixer for synthesizing a local oscillation signal of a variable frequency oscillator to eliminate an interference signal with a band elimination filter.

U.S. Pat. No. 6,219,376, entitled "Apparatuses and methods of suppressing a narrow-band interference with a compensator and adjustment loops", discloses a compensator rejecting narrow-band interferences by means of adjustment loops. Two general methods of building such loops are considered. The first method is based on filtering the in-phase and quadrature components of the error vector—a difference of the interference vector and compensating vector. The second method is based on filtration of amplitude and full phase of the interference signal. Automatic tuning of mean frequency and effective interference band in the compensator is ensured.

U.S. Pat. No. 4,613,978, entitled "Narrowband interference suppression system", discloses how strong narrowband signals interfering with the reception of a desired broadband signal are continuously suppressed by converting the received signal to a frequency-domain representation thereof, where strong narrowband interference components appear as strong impulse components. These impulsive components are blanked or clipped at a level that is a function of the average magnitude of the input signal. Resulting suppressed frequency-domain signals are reconverted to time-domain signals that are then available for further processing by conventional broadband signal receivers.

U.S. Pat. No. 8,345,808, entitled "Methods and apparatus for narrow band interference detection and suppression in ultra-wideband systems", discloses a method to accurately estimate the center frequency of narrow-band interference (NBI). The exemplary method uses multi-stage autocorrelation-function (ACF) to estimate NBI frequency. The exemplary method estimates the frequency in multiple stages. Each stage performs an ACF operation on the received signals. The first stage gives an initial estimation and the following stages refine the estimation. The results of all stages are combined to produce the final estimation.

U.S. Pat. No. 6,975,673, entitled "Narrow-band interference rejecting spread spectrum radio system and method", discloses a receiver and a method of rejection of narrow-band jamming signals using digital signal processing frequency domain techniques. The method includes transforming the received signal to a frequency domain signal and identifying narrow-band interference components in the frequency domain signal; suppressing the identified narrow-band interference components from the frequency domain signal.

However, what is needed is a simple digital adjustable filter for narrowband interference rejection that can be implemented without multiplications by shift-add operations.

SUMMARY OF THE INVENTION

The present invention is intended as a method and system for rejection of narrowband interference that substantially obviates one or several of the disadvantages of the related art.

In some cases, the broadband signals of navigation and communication systems are affected by narrowband interferences. To reject interference, complex notch filters with a large number of multiplications are usually used. This innovation is proposed to reject narrowband interferences by a simple digital adjustable filter that can be realized without multiplication. This is achieved using a number of modules, in which the frequency shift is realized by successive vector rotation based on the CORDIC algorithm for integers without multiplication; for reduction in the length of the rotated vector a simple algorithm without multiplication is proposed; and in order to remove the interference from a zero frequency region a simple high-pass filter without multiplication is also proposed. The number of modules is determined by the number of interferences for which rejection is desired.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
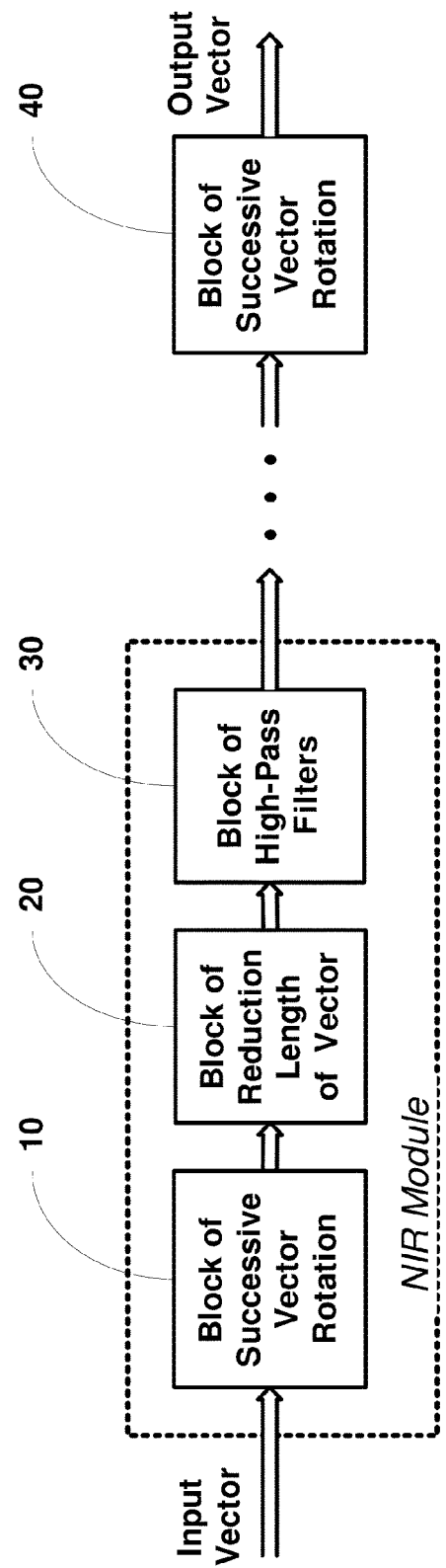
FIG. 1 is a functional block diagram for an embodiment of the invention.

FIG. 1 shows a functional block diagram for a digital adjustable filter for narrowband interference rejection of the input digital complex process, an additive mixture of the desired wideband signal, one or more narrowband interferences and noise. The input process is represented by the digital quadrature samples $I_n^{IN}$ and $Q_n^{IN}$, that are convenient to consider as a vector $(I_n^{IN}, Q_n^{IN})$, where $n=t/T_s$, here $T_s$ is the sampling period, $n=0, 1, 2, \ldots$ The digital adjustable filter comprises one or more series-connected modules of narrowband interference rejection (NIR), each of which is designed to cut a narrow band of the spectrum of the input complex process. The NIR module includes the following series-connected blocks:

(i) a block of successive vector rotation (SVR) (10 of FIG. 1), (ii) a block of reduction the length of the rotated vector (RLV) (20 of FIG. 1), (iii) a block of zero frequency rejection (ZFR) (30 of FIG. 1).

Figure 2:
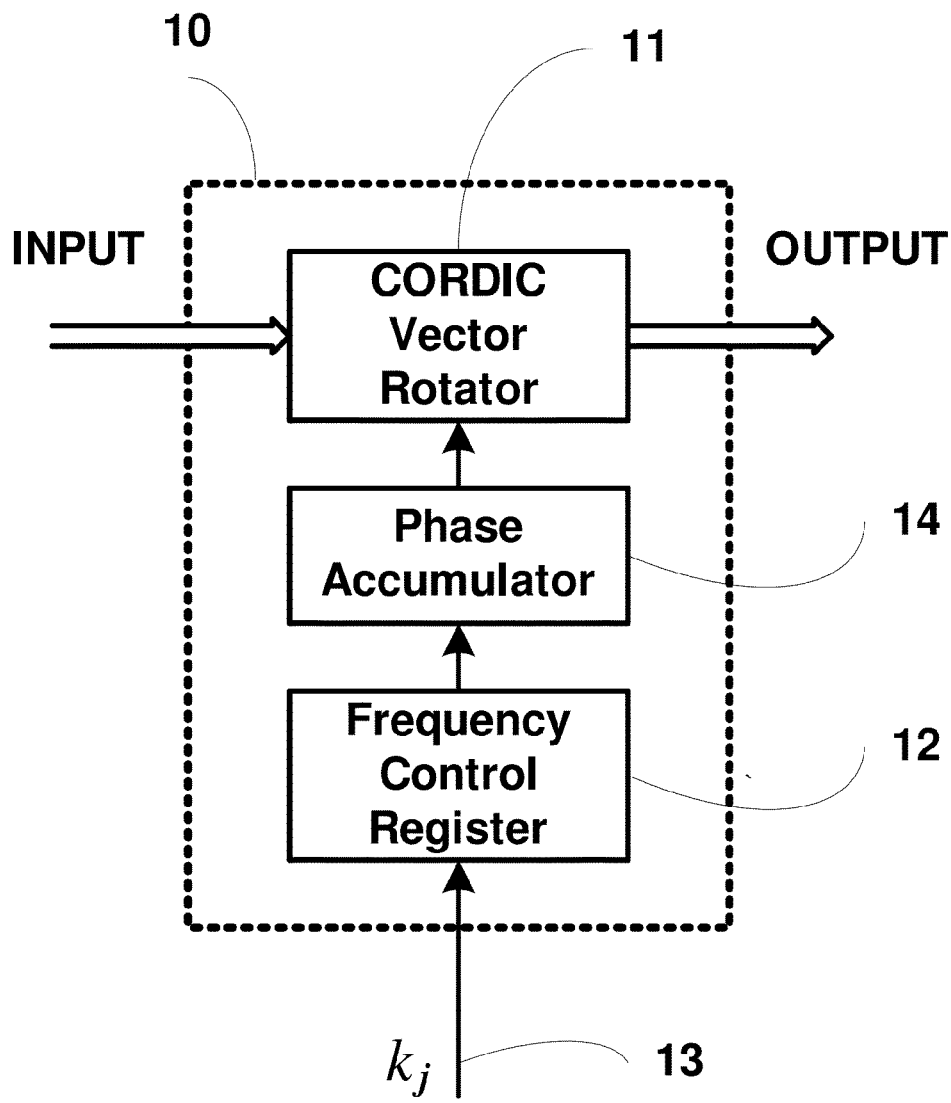
FIG. 2 is a functional diagram of a block of successive vector rotation.

The SVR block 10 is designed to move the known frequency narrow-band interference in the region of zero frequency by rotation input vector $(I_n^{SVR,in}, Q_n^{SVR,in})$ by the predetermined angles $\theta_n$. The SVR block comprises:

(iv) a CORDIC vector rotator (CVR) (11 of FIG. 2), (v) a frequency control register (FCR) (12 of FIG. 2), (vi) a phase accumulator (PA) (14 of FIG. 2).

The use without multiplication operations suggests successive vector rotation based on the shift-add structure of the CORDIC (CO-ordinate Rotation by DIgital Computer) algorithm, see Volder, Jack E., "The CORDIC Trigonometric Computing Technique", IRE Transactions on Electronic Computers, Volume EC-8, 330-334, September 1959. Rotation of a vector is performed by CVR (11 of FIG. 2) in a sequence of rotations with decreasing the angle $\alpha_i = \mathrm{arc\,tg}(2^{-i})$, $i=0, 1, 2, \ldots, i_{max}$, in order to rotate in sum nearly to a predetermined angle $\theta_n$. If the angle of rotation represented by an M-bit integer $\theta_n^{SVR}$, the numbers $\beta_i = \mathrm{int}(\alpha_i \cdot 2^M / 2\pi + 0.5)$ are stored in memory. To provide sufficient rotation, M iterations are applied, that is, $i_{max} = (M-1)$.

The CVR operates in accordance with the following equations. Initial conditions are as follows:

if $-2^{M-2} < \theta_n^{SVR} < 2^{M-2}$, then $z_{0,n} = \theta_n^{SVR}$; $I_{0,n} = I_n^{SVR,in}$; $Q_{0,n} = Q_n^{SVR,in}$;

if $\theta_n^{SVR} \leq -2^{M-2}$, then $z_{0,n} = \theta_n^{SVR} + 2^{M-1}$; $I_{0,n} = -I_n^{SVR,in}$; $Q_{0,n} = -Q_n^{SVR,in}$;

If $\theta_n^{SVR} \geq 2^{M-2}$, then $z_{0,n} = \theta_n^{SVR} - 2^{M-1}$; $I_{0,n} = -I_n^{SVR,in}$; $Q_{0,n} = -Q_n^{SVR,in}$.

Further for $i=0, \ldots, (M-1)$ compute:

$\sigma_{i,n} = \mathrm{sign}(z_{i,n})$, $I_{i+1,n} = I_{i,n} - \sigma_{i,n} \cdot Q_{i,n} / 2^i$, $Q_{i+1,n} = Q_{i,n} + \sigma_{i,n} \cdot I_{i,n} / 2^i$, $z_{i+1,n} = z_{i,n} - \sigma_{i,n} \cdot \beta_i$.

We finally have: $I_n^{SVR,out} = I_{M-1,n}$; $Q_n^{SVR,out} = Q_{M-1,n}$, where $(I_n^{SVR,out}, Q_n^{SVR,out})$ is the signal vector at the SVR output.

The angle of rotation $\theta_n^{SVR}$ submitted by M-bit integer is formed as follows. A frequency control register (FCR) (element 12 of FIG. 2) has K-bit ($K \geq P \geq M$) and stores the reference frequency number $k_j$ 13, which corresponds to interference frequency $F_j$ at the input of the SVR block $k_j = \mathrm{int}(F_j / F_s \cdot 2^K + 0.5)$, where $F_s = 1/T_s$ is the sampling frequency. A phase accumulator (PA) accumulates with sampling frequency a number $k_j$ stored in FCR: $\theta_n^{PA} = \theta_{n-1}^{PA} + k_j$, wherein M high bits of the PA are connected to the reference CVR input and determine the angle of rotation, equal to $\theta_n^{SVR} = \theta_{n-1}^{PA} \cdot 2^{-(P-M)}$.

A sampling frequency $F_s$ is often very high (tens of megahertz) and M iterations is difficult to perform in the time $T_s$. In this case calculations can be performed by using pipelining.

Since each the NIR module performs a frequency shift, the carrier frequency at the output of the last module differs from its original value at the input of the digital adjustable filter. In many cases it is desirable to shift back carrier frequency to its original value. In such cases, an additional SVR block (40 of FIG. 1) is connected to the output of the last NIR module, where the frequency number k equals $$k = \sum_{j=1}^{J} k_j,$$

where J is the total number of NIR modules.

The CORDIC rotation converts the vector $(I_n^{in}, Q_n^{in})$ into the vector $(I_n^{out}, Q_n^{out})$, wherein the length of the vector is increased to $\approx 1.65$ times, if $M \gg 1$. To keep increasing of the bit numbers, block 20 of reducing the length of the rotated vector is used. The RLV block 20 can operate in accordance with the following equations, which can be executed without multiplication by shift-add operations:

in-phase output is $I_i^{RLV,out} = I_i^{RLV,in} - I_i^{RLV,in} \cdot 2^{-2} - I_i^{RLV,in} \cdot 2^{-3}$, quadrature output are $Q_i^{RLV,out} = Q_i^{RLV,in} - Q_i^{RLV,in} \cdot 2^{-2} - Q_i^{RLV,in} \cdot 2^{-3}$, where $I_i^{RLV,in}$-in-phase RLV input, $Q_i^{RLV,in}$-quadrature RLV input.

Figure 3:
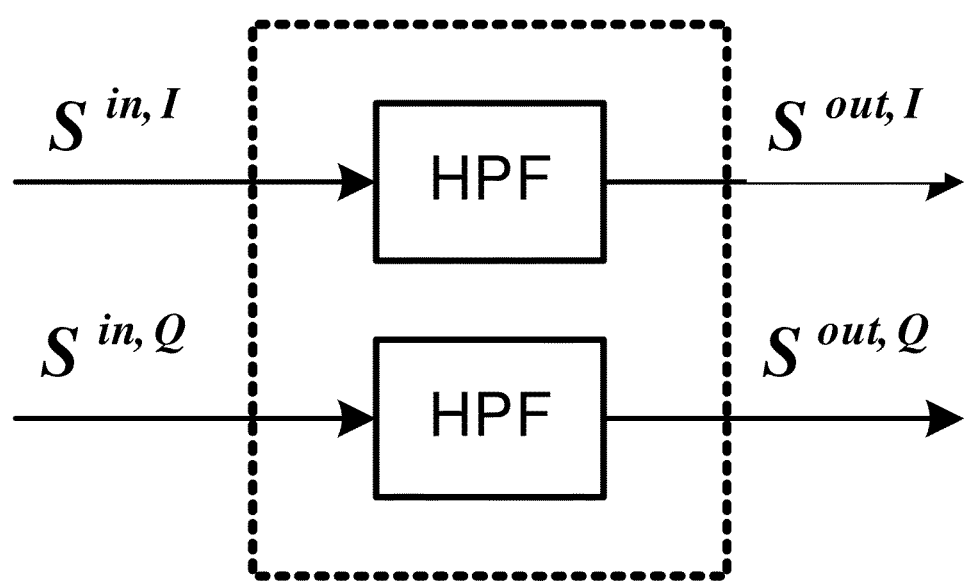
FIG. 3 is a functional diagram of block of zero frequency rejection.
Figure 4:
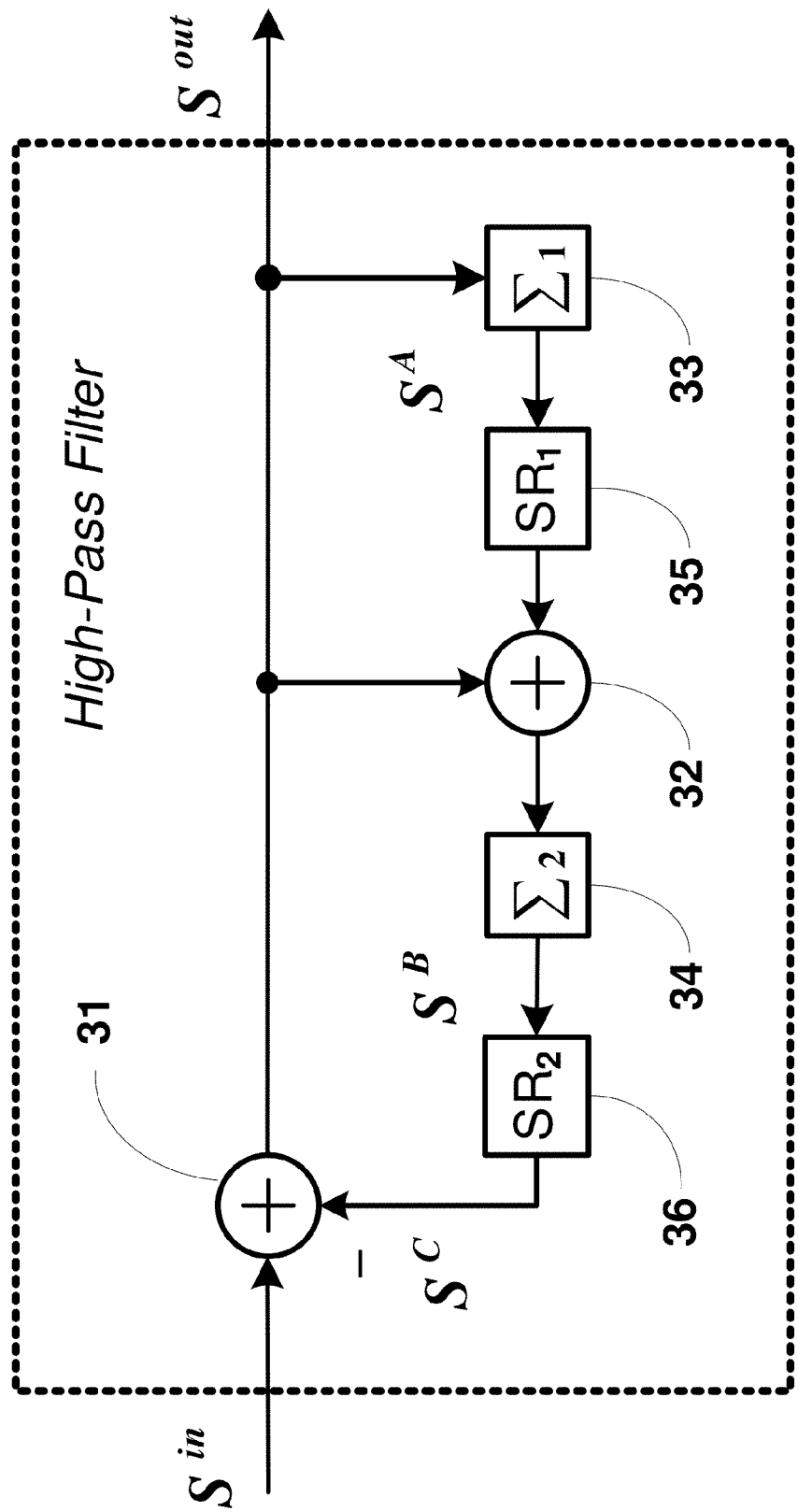
FIG. 4 is a functional diagram of the high-pass filter.

Thus $I_i^{RLV,out} = 0.625 \cdot I_i^{RLV,in}$ and $Q_i^{RLV,out} = 0.625 \cdot Q_i^{RLV,in}$, i.e. the length of the rotated vector reduced by 1.6 times. The ZFR block (30 of FIG. 1) comprises two adjustable high-pass filters (HPF) for orthogonal components of the reduced vector in order to remove the interference from zero frequency region. Each adjustable HPF comprises: a subtractor, a first input of which is the HPF input, and the output is an HPF output, (31 of FIG. 3) an adder (32 of FIG. 3), a first accumulator (33 of FIG. 3), a second accumulator (34 of FIG. 3), a first adjustable shift register ($SR_1$) (35 of FIG. 3), a second adjustable $SR_2$ (36 of FIG. 3), where the subtractor output is connected to the first input of the adder and to the input of the first accumulator, whose output is connected to the input of the first adjustable SR, the output of which is connected to the second input of the subtractor, the output of which is connected to the input of the second accumulator, the output of which is connected to the input of the second adjustable SR, the output of which is connected to the second input of the subtractor; wherein in each cycle the number of accumulators corresponds to the respective SR and are shifted by a certain number of bits to obtain the desired filter bandwidth.

The HPF operates in accordance with the following equations:

for in-phase HPF output $S_i^{out,I}$ are $$\begin{cases} S_i^{out,I} = S_i^{in,I} - S_{i-1}^{C,I}, \\ S_i^{A,I} = S_{i-1}^{A,I} + S_i^{out,I}, \\ S_i^{B,I} = S_{i-1}^{B,I} + S_i^{out,I} + S_i^{A,I} \cdot 2^{-b1}, \\ S_i^{C,I} = S_i^{B,I} \cdot 2^{-b2}. \end{cases}$$

for quadrature HPF output $S_i^{out,Q}$ are $$\begin{cases} S_i^{out,Q} = S_i^{in,Q} - S_{i-1}^{C,Q}, \\ S_i^{A,Q} = S_{t-1}^{A,Q} + S_i^{out,Q}, \\ S_i^{B,Q} = S_{t-1}^{B,Q} + S_i^{out,Q} + S_i^{A,Q} \cdot 2^{-b1}, \\ S_i^{C,Q} = S_i^{B,Q} \cdot 2^{-b2}. \end{cases}$$

Figure 5:
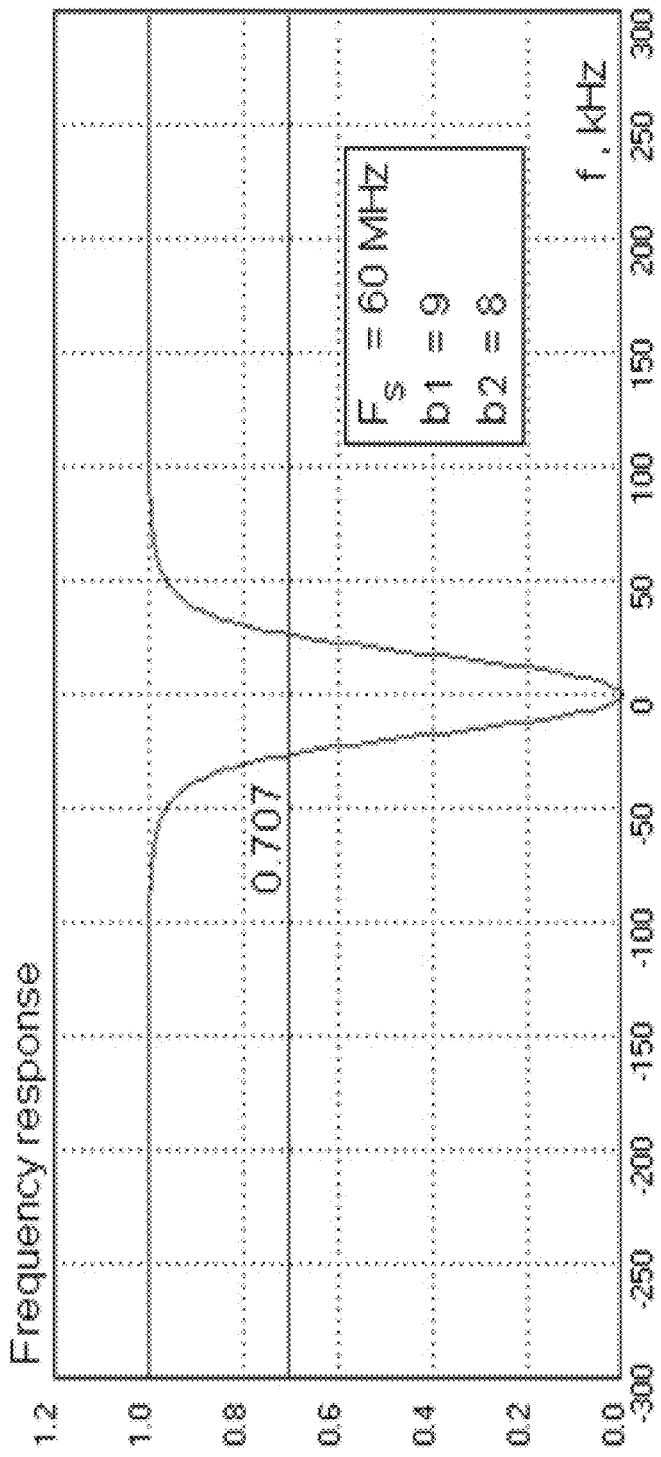
FIG. 5 is a frequency response of block of the high-pass filters.

Here ($S_n^{in,I}$, $Q_n^{in,Q}$) are the signal vector at the HPF input, b1 and b2—number of shift bits, respectively, of the 1-st and 2-nd shift registers. FIG. 5 shows a frequency response of the ZFR block when $F_s$=60 MHz, b1=9 and b2=8.

Having thus described the invention, it should be apparent to those skilled in the art that certain advantages of the described apparatus have been achieved.

It should also be appreciated that various modifications, adaptations, and alternative embodiments thereof may be made within the scope and spirit of the present invention. The invention is further defined by the following claims.

What is claimed is:

1. A digital filter for interference rejection of an input digital signal, the filter comprising:
a plurality of narrowband interference rejection (NIR) modules connected in series, each of the NIR modules including the following blocks connected in series:
    (i) a successive vector rotation (SVR) block comprising:
        a) a CORDIC vector rotator (CVR) that rotates an input vector in a plane,
        wherein the vector rotation is carried out by a number of successive turns and with a decreasing angle;
        b) a frequency control register (FCR) storing a reference frequency number, which corresponds to a narrowband interference frequency;
        c) a phase accumulator (PA) that accumulates the reference frequency number at a sampling frequency,
        wherein an output of the PA is provided to the CVR;
    (ii) a block for reducing a length of the rotated vector (RLV) to maintain the same number of bits for representing the input digital signal; and
    (iii) a zero frequency rejection (ZFR) block, including two high-pass filters (HPFs) for removing narrowband interference from a zero frequency region of orthogonal components of the reduced rotated vector.

2. The digital filter of claim 1, wherein the SVR block returns a signal carrier frequency back to its original value, once the narrowband interference is removed.

3. The digital filter of claim 1, wherein the RLV block operates based on the following equations, and without multiplication by shift registers:

in-phase output is $I_i^{out} = I_i^{in} - I_i^{in} \cdot 2^{-2} - I_i^{in} \cdot 2^{-3}$, quadrature output is $Q_i^{out} = Q_i^{in} - Q_i^{in} \cdot 2^{-2} - Q_i^{in} \cdot 2^{-3}$, where $I_i^{in}$ is the in-phase input, and $Q_i^{in}$ is the quadrature input.

4. The digital filter of claim 1, wherein the ZFR block includes two high-pass filters (HPFs) with an adjustable filter bandwidth, for the corresponding in-phase and quadrature components of the input digital signal, and wherein each HPF comprises:
    (i) a subtractor, whose input is an input of the HPF, and whose output is an output of the HPF,
    (ii) an adder,
    (iii) a first accumulator,
    (iv) a second accumulator,
    (v) a first adjustable shift register (SR),
    (vi) a second adjustable SR,
    wherein the output of the subtractor is connected to a first input of adder and to an input of the first accumulator,
    wherein an output of the first accumulator output is connected to an input of the first adjustable SR,
    wherein an output of the first adjustable SR is connected to a second input of the subtractor,
    wherein the output of the subtractor is connected to an input of the second accumulator,
    wherein an output of the second accumulator is connected to an input of the second adjustable SR,
    wherein an output of the second adjustable SR is connected to a second input of subtractor, and
    wherein, in each cycle, a number of accumulators corresponding to the respective SR are shifted by a number of bits to obtain a desired filter bandwidth.

5. The digital filter of claim 1, wherein the input digital signal includes a wideband signal and the interference signal that is narrowband.

6. The digital filter of claim 1, wherein the CORDIC vector rotator is based on a shift-add structure.

7. The digital filter of claim 1, wherein the vector rotation is performed without multiplication.

* * * * *